United States Patent Office 2,705,863
Patented Apr. 12, 1955

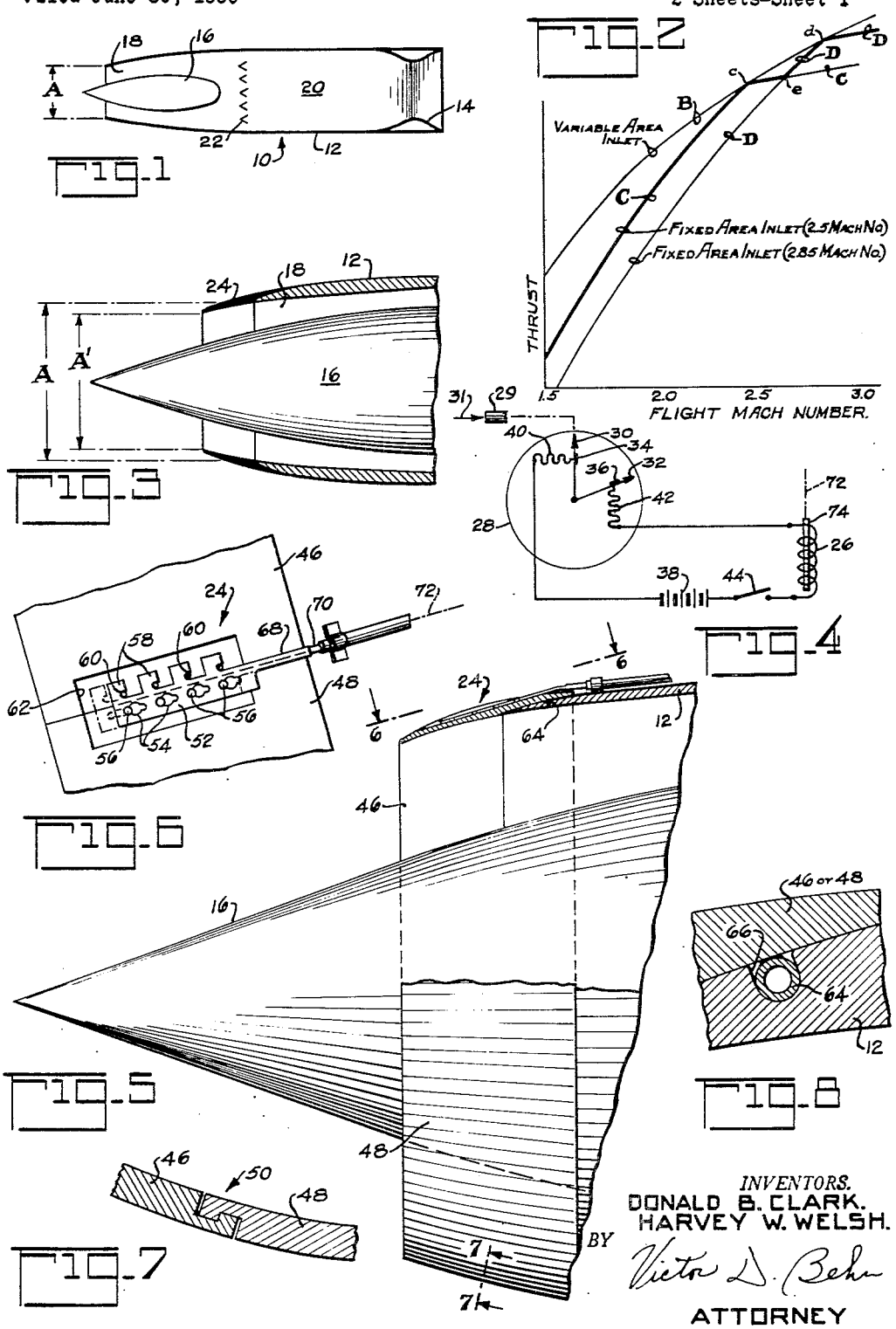

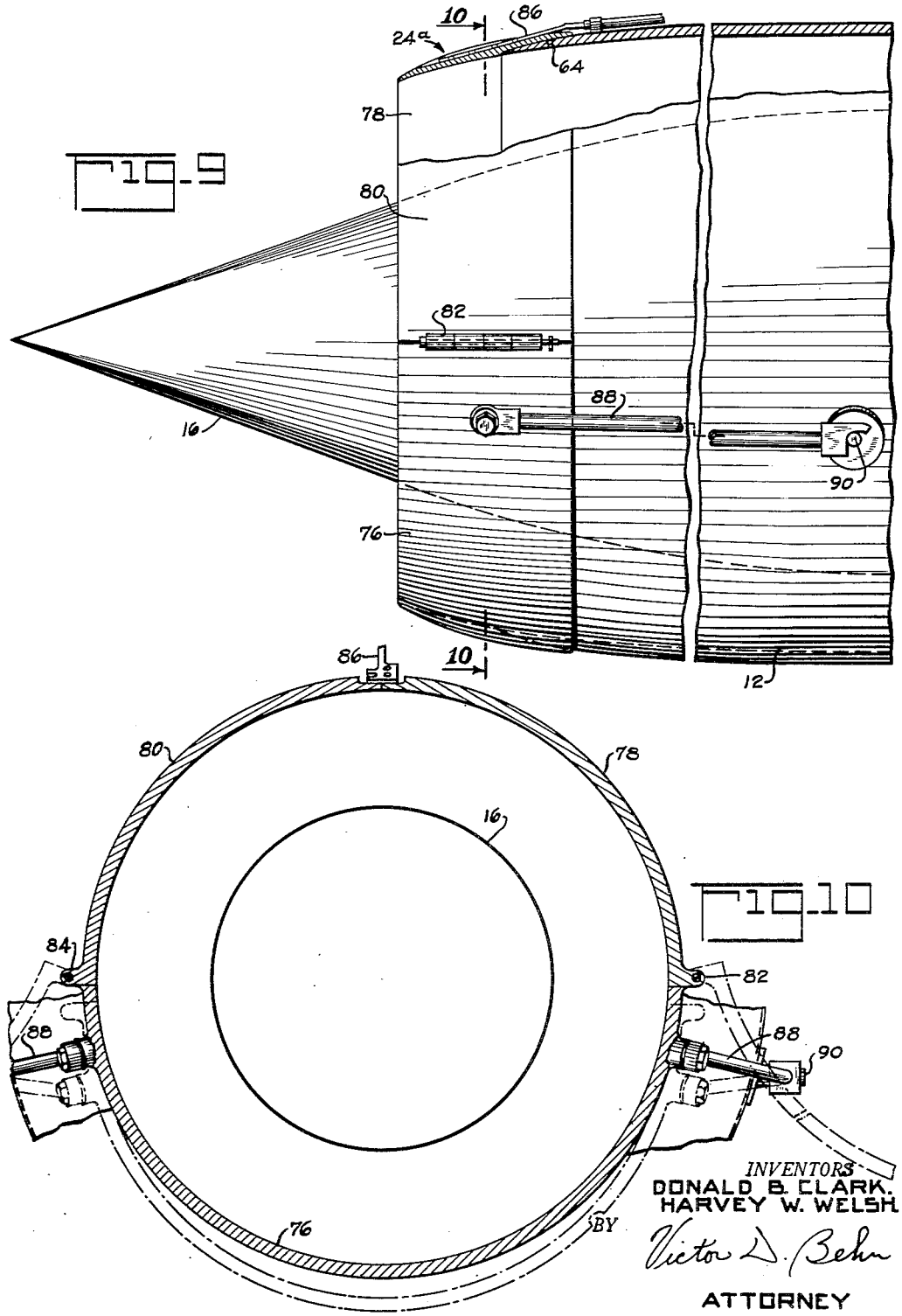

2,705,863

JET ENGINE WITH ADJUSTABLE AIR INLET CAPTURE AREA

Donald B. Clark, Wayne, and Harvey W. Welsh, Wyckoff, N. J., assignors to Curtiss-Wright Corporation, a corporation of Delaware Application June 30, 1950, Serial No. 171,268

5 Claims. (Cl. 60—35.6)

This invention relates to ram jet type power plants for aircraft and is particularly directed to such a power plant having means for varying the air inlet capture area of said power plant and to a method of operating such a power plant. As herein used, by "air inlet capture area" of the power plant is meant the entire area bounded by the periphery of the air inlet opening of said power plant. Also, as herein used, the term "aircraft" is intended to include missiles.

It is known that in order to improve the inlet characteristics of a ram jet power plant for maximum thrust, said power plant should have a relatively small air inlet capture area when the power plant is operating at speeds considerably below the maximum speed for which said power plant is designed. Prior proposals for improving said air inlet characteristics include the provision of means for axially adjusting the position of a center body at said inlet and/or the provision of means for bleeding air from the diffuser section of the air inlet. These prior proposals, however, do not accomplish the basic requirement, namely that of reducing the air inlet capture area at relatively low air speeds. Furthermore the mechanism required to carry out said prior proposals adds considerable weight to the power plant.

In accordance with the present invention a ram jet power plant is provided with an expendable inlet extension which reduces the inlet capture area of the cowl, said cowl extension being releasably secured to the power plant so that it can be dropped or jettisoned while the power plant is in flight.

A further object of the invention comprises the provision of means for effecting release of said extension upon the attainment of a predetermined flight speed. In accordance with the present invention said extension is automatically released when said flight speed exceeds a value corresponding to a particular Mach number greater than unity. Mach number is a well known quantity which may be defined as the ratio of velocity through a fluid to the velocity of sound in said fluid. Thus Mach numbers greater than unity designate super-sonic velocities while Mach numbers less than unity designate sub-sonic velocities.

Other objects of the invention will become apparent upon reading the annexed detailed description in connection with the drawing in which:

Figure 1 is a diagrammatic view of a conventional ram jet power plant;

Figure 2 is a graph which illustrates the relation between the thrust output of a ram jet power plant and its flight speed (in Mach numbers), three separate curves are shown, the one being for a power plant whose inlet capture area is varied for maximum thrust and the other two curves being for power plants having fixed inlet capture areas;

Figure 3 is a view of the entrance portion of a ram jet power plant having an expendable air inlet extension;

Figure 4 is a diagrammatic view of means for automatically controlling the release of the expendable air inlet extension;

Figure 5 is an enlarged view similar to Figure 3 and illustrating a specific form of mechanism for releasably securing the expendable air inlet extension to the power plant;

Figures 6 and 7 are views taken along lines 6—6 and 7—7 respectively of Figure 5;

Figure 8 is an enlarged view of a portion of Figure 5;

Figure 9 is a view similar to Figure 5 but illustrating a modified form of said mechanism; and Figure 10 is a view taken along line 10—10 of Figure 9.

Referring first to Figure 1 of the drawing, reference numeral 10 designates a conventional ram jet power plant. Said power plant comprises a duct member 12 having a discharge nozzle 14 at its rear end. A center body 16 is co-axially supported at the front or forward end of said duct member thereby providing the power plant with an annular forwardly directed air entrance passage 18. Downstream of the center body 16, the ram jet power plant has a combustion chamber 20 to which fuel is arranged to be supplied, by a schematically illustrated burner structure 22, for combustion with the air entering said chamber through the entrance passage 18. The fuel pump or pumps and associated mechanism for supplying fuel to the burner structure 22 preferably are housed within the center body 16. Aircraft equipped with such a ram jet power plant may also have a so-called booster rocket for assisting take-off. As herein used the term "take-off" includes launching from another aircraft as well as from the ground.

In Figure 1, A indicates the diameter of the air inlet capture area of the ram jet power plant 10. Performance analyses of ram jet power plants have shown that a small air inlet capture area is desirable when the power plant is operating at speeds considerably below its design value. In fact, for maximum power plant thrust the air inlet capture area of said power plant should be progressively increased as the flight speed increases. That is, the free stream cross-sectional area of the tube or column of air entering the power plant should progressively increase as the flight speed increases. By the "free stream cross-sectional area" of the air entering the power plant is meant the cross-sectional area of the column or tube of air entering the power plant measured at a point which is sufficiently far upstream of the power plant that the air flow at said point, relative to the power plant, is undisturbed by the power plant or other portions of the aircraft.

Figure 2 is a graph which compares the variation in thrust output of a ram jet power plant in which the air inlet capture area is fixed with a ram jet power plant in which said area is varied for maximum thrust. In Figure 2 curve B is a theoretical curve for a ram jet power plant in which the air inlet capture area is varied for maximum thrust while curves C and D are curves for ram jet power plants in which their air inlet capture areas are fixed and are designed for maximum thrust at Mach numbers of 2.5 and 2.85 respectively. Thus curve C has its peak thrust on the curve A at a point $c$ corresponding to a Mach number of 2.5. Similarly curve D has its peak thrust on the curve A at a point $d$ corresponding to a Mach number of 2.85.

In order to reduce the air inlet capture area of the ram jet duct member 12 at low flight speeds, there is provided an expendable section 24 (Figure 3) forming a forwardly directed streamlined extension of said duct member. As indicated in Figure 3, the addition of the expendable extension 24 reduces the air inlet capture area of the power plant from one having a diameter A to one having a diameter $A^1$. If for example the ram jet power plant of Figure 1 were designed for maximum thrust at a flight speed corresponding to Mach number 2.85 then the extension 24 could reduce the inlet capture area so that with said extension maximum thrust would occur at a flight speed corresponding to a Mach number of 2.5. With such an arrangement, it is apparent from Figure 2 that at flight speeds below Mach number 2.5 the addition of the expendable section 24 increases the power plant thrust from curve D to curve C. As the flight speed increases above 2.5 Mach number (point $c$) the rate of increase of the power plant thrust falls off but remains above curve D until a speed corresponding to the point $e$ is attained. At this flight speed the expendable section is automatically released so that as the flight speed continues to increase the power plant thrust now follows along curve D. Thus, in accordance with the present invention, the expendable section 24 is automatically released at that flight speed at which the power plant thrust without the expendable section is equal to that with said section. Release of said expendable section increases the air inlet capture area to increase the free stream cross-sectional area of the tube or column of air entering the power plant.

With this combination, the power plant thrust output follows along the heavy line of Figure 2 so that the thrust output of the ram jet power plant is increased at the lower flight speeds. This enables the ram jet power plant to take over sooner from the take-off booster rocket and/or it permits a reduction in the size of said booster rocket.

The expendable air inlet section 24 is releasably secured to the duct member of the ram jet power plant and means are provided for releasing said section 24 at the desired flight condition. For example an electric solenoid 26 (Figure 4) may be provided for automatically releasing said expendable section upon energization of said solenoid. Preferably the expendable air inlet section 24 is automatically released at a flight speed Mach number corresponding to the point e of Figure 2. For this purpose energization of the release solenoid 26 may be controlled by any conventional Mach number meter carried by the aircraft and responsive to the Mach number of the flight speed.

The Mach number of the speed of an object through a gas is a function of the ratio of the impact pressure of said gas, relative to said object, to the static pressure of said gas. Accordingly, for flight at a particular altitude, the impact pressure of the surrounding air relative to the aircraft is a measure of the Mach number of the flight speed. In the case of guided missile therefore, energization of the release solenoid 26 for the expendable section 24 could be controlled by a meter responsive to the impact pressure of the surrounding atmosphere relative to the missile with a correction for the static pressure. Such a meter is schematically illustrated at 28 (Figure 4) and within a limited range of static pressure such a meter provides an approximate measure of the Mach number of the flight speed.

The meter 28 of Figure 4 comprises a rotatable arm 30 responsive to changes in the impact pressure of the surrounding air relative to the aircraft, said arm rotating clockwise in response to an increase in said pressure. For this purpose a Pitot tube 29 is directed into the surrounding airstream 31 relative to the aircraft, the impact pressure measured by said tube being transmitted to the meter 28 for operating the arm 30. The meter 28 also has a rotatable arm 32 responsive to the static pressure of the surrounding atmosphere and rotating in a clockwise direction in response to an increase in said pressure. The arms 30 and 32 carry electric contacts 34 and 36 respectively, said contacts being arranged to engage to complete an electric circuit for the release solenoid 26 across a source of electric energy 38. The circuit for the solenoid is connected to the movable contacts 34 and 36 by flexible leads 40 and 42 respectively. By properly proportioning the relative movements of the arms 30 and 32, the engagement of the contacts 34 and 36 of the meter 28 can be made to occur approximately at a desired predetermined Mach number of the flight speed within a limited range of static pressures whereby electric current flow in the circuit of the solenoid 26 is a signal that the flight speed has exceeded said predetermined value. As illustrated, the circuit for the release solenoid also includes a master switch 44 which is closed during flight.

Figures 6, 7 and 8 illustrate a specific structure of an expendable air inlet section 24 together with means for releasably securing said section to the duct member 12 of the ram jet power plant. The expendable section 24 comprises two semi-circular halves 46 and 48 having interlocking engagement along one of their edges as illustrated at 50 in Figure 7. The other ends of said semi-circular halves 46 and 48 are releasably held together by a locking plate 52.

The locking plate 52 has a plurality of key-hole-like holes 54 adapted to engaged headed pins 56 carried by the adjacent end of the semi-circular half 48. Said plate also has a plurality of hooked formations 58 adapted to engage pins 60 carried by the adjacent end of the other semi-circular half 46. Preferably the plate is disposed in a depression 62 so as not to project beyond the external profile of expandable air inlet section. Each half 46 and 48 also has a pipe-like flange 64 secured to its inner surface, as by welding, each said flange being receivable in an annular channel 66 in the duct member 12 to restrain said duct member and the expendable section 24 against relative axial movement.

With this construction of Figures 6, 7 and 8 and with the locking plate 52 in its full line position of Figure 6, the two semi-circular halves 46 and 48 of the expendable air inlet section 24 are securely held in position on the duct member 12, said section overlapping the forward end of the duct member 12 and forming a forwardly extending streamlined continuation of said duct member. When the locking plate 52 is moved to its dot and dash line position (Figure 6) during flight, the two halves 46 and 48 are released so that the internal pressure within the expendable section 24 forces said two halves to open up and fall way from the aircraft.

In order to move the locking plate 52 to its release position, said plate has an arm extension 68 engageable by the end 70 of a flexible cable 72 connected to the plunger 74 of the release solenoid 26. With this construction the locking plate 52 is moved to its release position upon energization of the solenoid 26.

The specific mechanism for supporting and effecting release of the expendable air inlet section forms no part of the present invention. Figures 9 and 10 illustrates a modified construction wherein an expendable air inlet extension 24a replaces the previously described expendable air inlet extension 24.

The expendable air inlet extension 24a comprises a semi-circular half 76 and a pair of quarter sections 78 and 80 hingedly connected, as indicated at 82 and 84 respectively, to opposite ends of said half section 76. The other ends of the quarter sections are arranged to abut and are releasably locked in this position by a locking plate 86. The locking plate 86 and associated pins and locking plate moving means correspond to the previously described locking plate 52, pins 56 and 60 and the means for moving the plate 52. In addition a pair of guide rods 88 are hingedly connected to the half section 76 on opposite sides of said section. Each rod 88 extends rearwardly from its said hinged connection and the rear end of said rod abuts against and overlies a pin 90 carried by the duct member 12.

With this construction of Figures 8 and 9, when the locking plate 86 is moved to its releasing position for releasing the expendable air inlet section 24a while the aircraft is in flight, the internal pressure forces the quarter sections 78 and 80 outwardly about the hinges 82 and 84 to their dot-and-dash line positions of Figure 10. At the same time the half section 76 drops, as also indicated by the dot-and-dash lines in Figure 10, and the guide rods 88 force the half section 76 and its outwardly hinged quarter sections 78 and 80 to swing downwardly about the pins 90 so as to clear the aircraft.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an aircraft jet engine having a duct member providing said engine with a forwardly directed air inlet opening and having a combustion chamber to which air for combustion is supplied from said inlet opening; mechanism operable to change the air inlet area of said duct member for changing the free stream cross-sectional area of the tube of air entering said duct member; means providing an engine flight-speed-responsive signal; and means controlled by said signal and operatively connected to said mechanism for automatically increasing the free stream cross-sectional area of said entering tube of air upon a predetermined increase in said flight speed.

2. In combination with an aircraft jet engine having a duct member providing said engine with a forwardly directed air inlet opening at its forward end and having a combustion chamber to which air for combustion is supplied from said inlet opening; mechanism operable to effect a change in the air inlet capture area of said duct member for changing the mass flow of air from said inlet to said combustion chamber; means for providing a signal indicative of the flight speed of the engine exceeding a predetermined value; and means controlled by said signal and operatively connected to said mechanism for automatically effecting an increase in said air inlet capture area in flight when said flight speed exceeds said predetermined value.

3. In combination with an aircraft jet engine having a duct member providing said engine with a forwardly directed air inlet opening at its forward end and having a combustion chamber to which air for combustion is supplied from said inlet opening; an expendable duct section arranged to be co-axially secured to said duct member so as to form a forward air inlet extension of said duct member with the forward end of said expendable section having a smaller air inlet capture area than the forward end of said duct member; means for releasably securing said expendable section to said duct member so that upon release of said expendable section the mass flow of air from said inlet to said combustion chamber is increased; means for providing an engine-flight-speed responsive signal; and means controlled by said signal and operatively connected to said releasable securing means for automatically effecting release of said expendable duct section in flight when said flight speed exceeds a predetermined value.

4. In combination with an aircraft jet engine having a duct member providing said engine with a forwardly directed air inlet opening at its forward end and having a combustion chamber to which air for combustion is supplied from said inlet opening; an expendable duct section arranged to be co-axially secured to said duct member so as to form a forward air inlet extension of said duct member with the forward end of said expendable section having a smaller air inlet capture area than the forward end of said duct member; means for releasably securing said expendable section to said duct member so that upon release of said expendable section the mass flow of air from said inlet to said combustion chamber is increased; means for providing a signal indicative of the flight speed of the engine through the surrounding atmosphere exceeding a predetermined supersonic value; and means controlled by said signal and operatively connected to said releasable securing means for automatically effecting release of said expendable section in flight when said flight speed exceeds said value.

5. In combination with an aircraft ram-jet engine having a duct member providing said engine with a forwardly directed air inlet opening at its forward end and having a combustion chamber to which air for combustion is supplied from said inlet opening; an expendable duct section arranged to be co-axially secured to said duct member so as to form a forward air inlet extension of said duct member with the forward end of said expendable section having a smaller air inlet capture area than the forward end of said duct member; means for releasably securing said expendable section to said duct member so that upon release of said expendable section the mass flow of air from said inlet to said combustion chamber is increased; means responsive to the flight speed of the engine through the surrounding atmosphere for providing a signal when said flight speed exceeds a predetermined supersonic value; and means controlled by said signal and operatively connected to said releasable securing means for automatically effecting release of said expendable section in flight when said flight speed exceeds said value.

References Cited in the file of this patent

UNITED STATES PATENTS

| | | |
|---|---|---|
| 2,396,598 | Neumann | Mar. 12, 1946 |
| 2,501,633 | Price | Mar. 21, 1950 |
| 2,540,594 | Price | Feb. 6, 1951 |